United States Patent [19]
Vermolen

[11] 3,963,973
[45] June 15, 1976

[54] NONSATURATING ASYMMETRIC DC/DC CONVERTER

[75] Inventor: Johannes Volkert Vermolen, Beekbergen, Netherlands

[73] Assignee: U.S. Philips Corporation, New York, N.Y.

[22] Filed: June 26, 1974

[21] Appl. No.: 483,136

[30] Foreign Application Priority Data
June 29, 1973 Netherlands .................. 7309056

[52] U.S. Cl. .................................. 321/2; 321/10; 321/455
[51] Int. Cl.² ........................................ H02M 3/335
[58] Field of Search ............. 321/2, 10, 45 ER, 45 S, 321/18; 331/11 Z; 323/DIG. 1

[56] References Cited
UNITED STATES PATENTS

| | | | |
|---|---|---|---|
| 3,388,309 | 6/1968 | Banks et al. | 321/2 |
| 3,526,823 | 9/1970 | Genuit | 321/2 |
| 3,639,826 | 2/1972 | Grundberg | 321/18 X |
| 3,697,852 | 10/1972 | Gerbitz | 321/2 |
| 3,781,637 | 12/1973 | Potter | 321/10 |
| 3,816,809 | 6/1974 | Kuster | 321/2 |

FOREIGN PATENTS OR APPLICATIONS
1,174,774  12/1969  United Kingdom ........... 321/45 ER OTHER PUBLICATIONS
IBM Technical Disclosure Bulletin, vol. 13, No. 9, pp. 2767, 2768, Feb. 1971.

Primary Examiner—William M. Shoop
Attorney, Agent, or Firm—Frank R. Trifari; Bernard Franzblau

[57] ABSTRACT

A DC converter including a transistor switch and a transformer having first and second windings connected so that the transistor passes asymmetrical current pulses to the first winding. When the switch opens, asymmetrical current pulses again pass through the first winding and through a gating circuit connected thereto. The instantaneous voltage across the second winding is used as the drive voltage for the transistor switch to prevent transformer saturation.

9 Claims, 4 Drawing Figures

NONSATURATING ASYMMETRIC DC/DC CONVERTER

The invention relates to a direct current converter, comprising a series connection of a first direct current input terminal, a current interrupter which is active in one direction, a first transformer winding, and a second direct current input terminal, and furthermore comprising a second series connection of a first direct current output terminal, a rectifying element, a second transformer winding which is electromagnetically coupled to the first transformer winding, and a second direct current output terminal, the second series connection being connected to a smoothing circuit element, the current interrupter being steered for passing first asymmetrical current pulses through the first transformer winding, the said pulses being capable of inducing at the same time second asymmetrical current pulses in the second transformer winding. A direct current converter of this kind is known as an "Eintakt-durchflusswandler", "Single Tube Transmitting-converter" Asymmetrical current pulses are to be understood to mean hereinafter pulses which proceed completely or substantially completely in one direction. The first asymmetrical current pulses at the same time generate second asymmetrical current pulses, the magnetisatons in the transformer opposing each other. As a result, a transformer yoke of light construction can be used without the risk of saturation. Due to core losses in the transformer yoke during the first and second asymmetrical current pulses, a difference, which 120 in time, occurs between these two kinds of pulses, with the result that the magnetisation increases. When the first asymmetrical current pulses are terminated by the opening of the current interrupter, asymmetrical voltage pulses appear across the first transformer winding in the opposite direction. This produces undesired effects, particularly at high power levels. A direct current converter of this kind is known from the book "Stromversorgung" by S.W. Wagner, page 602, section 9.2.6.2., Hamburg 1964. The current interrupter is a transistor having its base connected to an auxiliary winding of the transformer which is furthermore connected to a voltage divider connected between the two direct current input terminals. Furthermore, the alternation in time of first and second asymmetrical current pulses is known. However, the invention does not relate to such a "Sperrwandler" ("Blocking converter"). So as to avoid the adverse effects of said asymmetrical voltage pulses, the invention is characterized in that connections of the first transformer winding are connected to a gating circuit which blocks current pulses corresponding to the first asymmetrical current pulses when the current interrupter is closed and which, when the current interrupter is open, allows passage of third asymmetrical current pulses which can then be induced in said first transformer winding and which are oppositely directed with respect to the first asymmetrical current pulses of the gating circuit. The said publication by Wagner (page 602, section (9.2.6.3) describes a Saturation-driver Transistor-converter comprising two transistors, each of which excites one half of a winding with current pulses which are asymmetrical per se. However, for the winding in its entirety the current pulses are then symmetrical, with the result that the problem of the asymmetrically induced voltage pulses does not occur. The single, asymmetrical, current pulses then must be equally large because otherwise permanent saturation occurs in one direction after some time. This problem is solved in the known circuit in that the transformer is saturated in each half cycle. However, the flexibility is then completely lost. The said problems are suitably solved according to the invention. The second series connection preferably includes a series choke coil. The use of such a choke coil is known per se, but within the scope of the invention a very favourable solution is thus obtained. The second asymmetrical current pulses are smoothed to substantially a direct current, while it is an additional advantage of the use of the transformer that the two windings are not galvanically coupled. This results in a very advantageous system, in combination with the passing through of the third asymmetrical current pulses.

The gating circuit preferably bridges the first transformer winding. The said voltage pulses are then neutralized.

The gating circuit preferably comprises a series connection of a rectifying element which is driven in the reverse direction for the first asymmetrical current pulses and a circuit element which is to be rendered conductive for the third asymmetrical current pulses under the control of a voltage difference which is generated by the third asymmetrical current pulses. It is advantageous if the circuit element is thus automatically conductive.

The circuit element to be rendered conductive preferably comprises a zener diode. The use of a zener diode results in a very simple construction.

The direct current input terminals are preferably connected by a component in which electric energy can be stored, the current interrupter comprising a current-interrupting element in each of the connection leads to the first transformer winding, the gating circuit comprising two branches which are cross-wise connected between connection lines of the current-interrupting elements from the first transformer winding and to the first transformer winding. For high voltages and/or power levels this is advantageous because the energy in the induced third current pulses is now recovered. It is a further advantage that the current-interrupting elements are now required to carry a lower may be cheaper.

The component in which electric energy is to be stored is preferably a capacitor.

This is a simple solution. An accummulator can alternatively be used.

The connections of the second transformer winding are preferably connected to connections of a element for generating a blocking signal, under the control of a voltage difference between these connections, in order to block a closing command signal for said current interrupter. Without the use of an additional signal winding, a signalling system is thus obtained to ensure that the magnetisation of the transformer yoke does not become excessively large. If the voltage present exceeds a given value, the current interrupter cannot be closed.

If said direct current input terminals are interconnected by a capacitive element, a series resistor is preferably connected in a supply line to one of the direct current input terminals; This embodiment is characterized in that a third transformer winding which is electromagnetically coupled to the first transformer winding is provided, having connected thereto a rectifying/smoothing circuit whose output signal is capable of rendering a circuit element which bridges the series resistor conductive.

It is known per se to short-circuit a series resistor as soon as the voltage on the capacitive element is high enough. The drive system is substantially simplified due to the use of an additional transformer winding, without an additional circuit element such as a relay being required.

The invention will be described in detail hereinafter with reference to the accompanying drawing in which FIG. 1 shows a direct current converter according to the present state of the art;

A direct current source can be connected to the direct current input terminals K1, 2. When transistor A1 becomes conductive, an asymmetrical current pulse is generated in the winding T2. The resistors R1 and R2 constitute a voltage divider, with the result that the capacitor C2 carries a voltage which amounts to a fixed fraction of the voltage between the direct current input terminals K1, 2. When the converter is switched on (winding T2 does not yet carry a current), the base voltage of the transistor A1 is lower than its emitter voltage, so that the transistor 1 becomes conductive. The forward directions of the transistor A1 and the diode D1 and the winding sense of transformer windings T2 and T3 are chosen such that the magnetisations produced by the currents allowed to pass oppose each other, so that initially the magnetisation of the transformer yoke remains small. Consequently, the section of the yoke may be proportioned to be small. Core losses in the yoke slowly increase the current in the primary winding in time. At the same time, across winding T1 a voltage is induced so that the potential of the base electrode of transistor A1 increases until this transistor is cut off at a given instant. The currents in the windings T2 and T3 then abruptly decrease, but because the current in T2 up to then had been increased slowly, a discrepancy remains so that a high voltage is induced across the transformer winding T2. As a result, transistor A1 remains cut off for the time being. The induced voltages decrease due to dissipation, with the result that ultimately the base voltage of transistor A1 will be lower than the emitter voltage, and the transistor becomes conductive again so that another asymmetrical current pulse is generated. The self-oscilating action is not very flexible and the voltage peaks appearing across the transformer winding after is cut off the transistor are very undesirable. The transistor can be driven in another known manner, for example, in that the transformer is saturated, or by way of externally generated drive pulses applied to the base electrode of the transistor A1.

Figure 1:
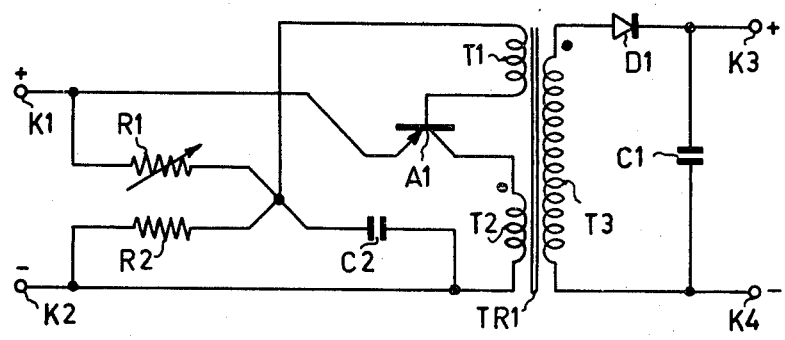
FIG. 1 shows a direct current converter two direct current input terminals K1, 2, a transistor A1, a transformer TR1 with transformer windings T1, 2, 3, two resistors R1, 2, two capacitors C1, 2, a diode D1, and two direct current output terminals K3, 4.

The current pulses generated in the transformer winding T3 are filtered and rectified in known manner by the diode D1 and the capacitor C1. Output power is then available at the direct current output terminals K3, 4. An advantage of the use of a transformer is that the direct voltage level at the primary side and the secondary side can still be chosen at will. However, the circuit shown in FIG. 1 is capable of supplying only one voltage.

Figure 2:
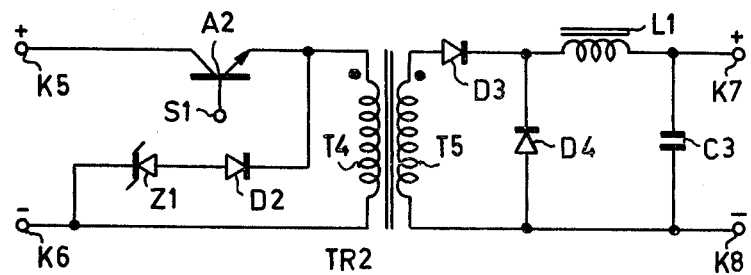
FIG. 2 shows a first embodiment of a direct current converter according to the invention.

FIG. 2 shows a first embodiment of a direct current converter according to the invention, comprising two direct current input terminals K5, 6, a transistor A2, three diodes D2, 3, 4, a zener diode Z1, a transformer TR2 comprising transformer windings T4, 5, a capacitor C3, a choke coil L1, two direct current output terminals K7, 8 and a drive input S1.

Under the commond of a known drive unit (not shown) positive drive pulses appear on the drive input S1 by means of which the transistor A2 can each time be rendered conductive. First asymmetrical current pulses are thus generated in the transformer winding T4. These currents at the same time generated current pulses in the transformer winding T5, with the result that the transformer yoke by the first asymmetrical current pulses is substantially compensated for. The asymmetrical current pulses induced in the winding T5 are rectified and smoothed by the diode D3, the choke coil L1 and the capacitor C3, with the result that direct current output power is available at the direct current output terminals K7, 8. The diode D4 is a free-running diode through which current passes when the transistor A2 is cut off. After the transistor A2 becomes conductive, the current through the transformer winding T4 slowly increases again under the influence of the core losses in the transformer TR2.

When the transistor A2 is conductive, the diode D2 is driven in the reverse direction and the current therein is blocked. When the transistor A2 is cut off, a voltage is again induced across the transformer winding T4. This voltage is then determined by the breakdown voltage of the zener diode Z1 which then becomes conductive. The third, inductively generated, asymmetrical current pulses are then passed through the gating circuit (D2-Z1). The associated dissipation mainly occurs in the zener diode Z1. However, this constitutes only a rather small part of the power load on the direct current input terminals. A resistor can be used instead of the zener diode.

The advantage of the zener diode is that the voltage drop thereacross is not dependent on the current. Consequently, for the same maximum voltage the discharge time is smaller because the current decreases according to an exponential curve when use is made of a resistor. Furthermore, it is alternatively possible to connect the gating circuit to a central tapping of the transformer winding T4. Without the risk of excessively high peak voltages across the winding T4, the power can then be higher than in the known circuit. The use of the choke coil L1, which is difficult in FIG. 1, can also result in better smoothing of the output current.

Figure 3:
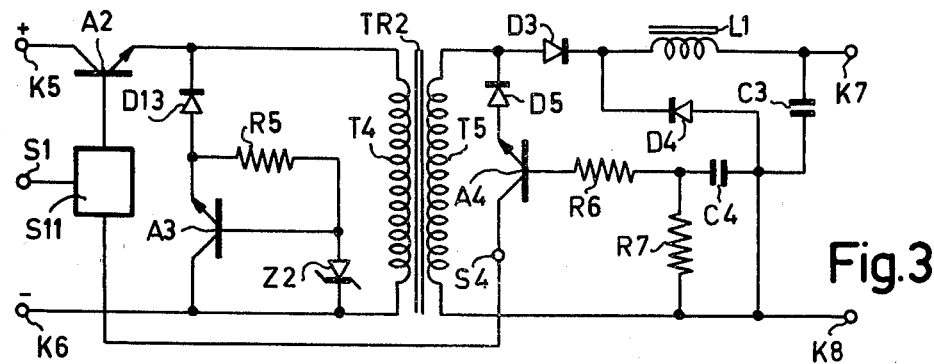
FIG. 3 shows a second embodiment of a direct current converter according to the invention.

FIG. 3 shows a second direct current converter according to the invention which comprises the elements K5, 6, 7, 8, A2, D3, 4, T4, 5, L1 and C3 shown in FIG. 2 and furthermore the transistors A3, 4, the zener diode Z2, the diodes D5, 13, the resistors R5, 6, 7, the capacitor C4, the drive output S4, and the blocking element S11.

When the transistor A2 is conductive, the gating circuit is blocked by the diode D13. When the transistor A2 is cut off, the zener diode Z2 starts to conduct at a low voltage, and hence the transistor A3 also becomes conductive for the voltage pulse induced in the transformer winding T4. The resistor R5 sets the transistor A3. Dissipation now takes place in the transistor A3 which can be readily constructed to suit high power levels. The right-hand half of FIG. 3 shows a circuit according to FIG. 2 and a drive circuits. A signal transistor $A_4$ is directly connected to the transformer secondary winding $T_5$ via a diode $D_5$ and resistors $R_6$ and $R_7$. By "directly connected" it is meant that the filter circuit L1-C3 is bypassed so that the transistor is under the instantaneous control of the transformer voltage. When transistor A2 is conductive, the diode D5 is driven in the reverse direction. When the transistor A2 is cut off and the transistor A3 is rendered conductive, the polarity of the voltage across the winding T5 changes. The diode D3 is then driven in the reverse direction. The emitter voltage of the transistor A4, however, now becomes low so that the transistor A4 can be readily rendered conductive. A base current is then supplied by the capacitor C4 which can be discharged again via the resistor R7 when the transistor A4 is cut off. On the drive output S4 a current signal can appear which is applied to the blocking element S11. As long as this signal is present, drive signals on the terminal S1 cannot render the transistor A2 conductive. Circuits for blocking the action of a drive signal are known per se. The signal at the output S4 disappears only after the transformer yoke has been sufficiently demagnetised and the voltage across the transformer winding T5 has sufficiently decreased. Also in the case of a large duty cycle of the transistor A2 it is thus prevented that the transformer could be saturated by the summing of residual magnetisations.

Figure 4:
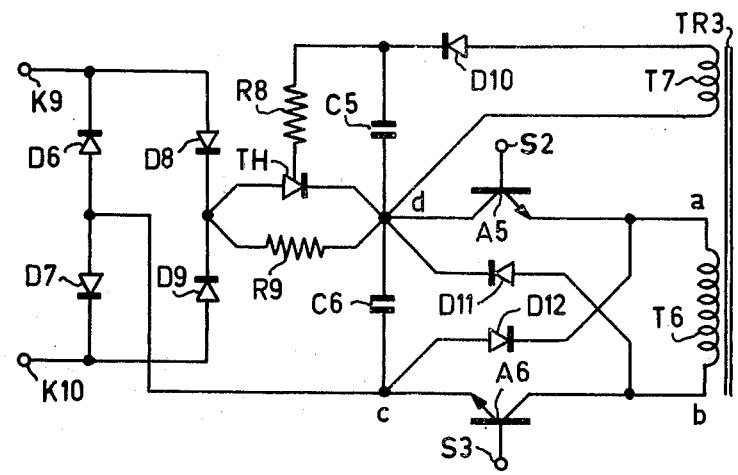
FIG. 4 shows a third embodiment of a direct current converter according to the invention.

FIG. 4 shows a third direct current converter according to the invention which comprises, in addition to a right-hand half which is not shown and which corresponds to that of FIG. 2 or 3, two alternating current input terminals K9, 10, two drive inputs S2, 3, two transistors A5, 6, seven diodes D6, 7, 8, 9, 10, 11, 12, two resistors R8, 9, two capacitors C5, 6, a thyristor TH and a transformer TR3 comprising the transformer windings T6, 7.

The alternating current received on the terminals K9, 10 is rectified by a Graetz circuit consisting of four diodes D6, 7, 8, 9 and is smoothed by the capacitor C6. The poles c, d of this capacitor act as direct current input terminals. The transistors A5, 6 can be rendered conductive by simultaneous drive pulses on the terminals S2, 3, so that first asymmetrical current pulses can be generated in the transformer winding T6. The diodes D11, 12 are driven in the reverse direction for these current pulses because the potential on point "A" is higher than the potential on point "b". If the two transistors are cut off, third asymmetrical current pulses are generated in the winding T6, the direction of these pulses being opposite to the first asymmetrical current pulses. For the third asymmetrical current pulses the diodes D11, 12 are driven in the forward direction because point "C" now has a potential which exceeds that of point "d". The capacitor C6 is recharged by the third asymmetrical current pulses. Due to the aforesaid energy recovery, less energy is dissipated. The recovery of energy can also be effected in an element having an accumulator function.

When the alternating current input terminals K9, 10 are connected to an alternating current source, or when the said direct current input terminals are connected to a direct current source (containing, for example, the rectifying circuit comprising the diodes D6, 9), a large, and hence undesired, current pulse would appear because the initially uncharged capacitor C6 constitutes a short-circuit. This current pulse is limited by the series resistor R9. When the capacitor C6 is charged, however, undesired energy is dissipated in the resistor R9. Simultaneously with the current pulses generated in the transformer winding T6, current pulses are now also induced in the transformer winding T7. The latter pulses are rectified by the diode D10, with the result that the capacitor C5 is charged. When the voltage thereacross is high enough, the thyristor TH receives a drive voltage via resistor R8, with the result that it is tuned "on" and the resistor R9 is short-circuited. Because a transformer is already present, the thyristor can be simply excited by way of an additional winding thereon.

The various aspects of the invention can be combined in a number of ways. For example, the circuit comprising the transistor A4 shown in FIG. 3 can also be used in the circuits of FIGS. 2 and 4, and the circuit containing the additional transformer winding T7 of FIG. 4 can also be used in the circuits shown in FIGS. 2 and 3. All these aspects are used to good advantage in combination with the gating circuit for the third asymmetrical current pulses.

What is claimed is:

1. A direct current converter, comprising a series connection of a first direct current input terminal, current interrupting means active in one direction, a first transformer winding connected to a gating circuit, and a second direct current input terminal, a second series connection of a first direct current output terminal, a rectifying element, a second transformer winding electromagnetically coupled to the first transformer winding, and a second direct current output terminal, means connecting the said second series connection to a smoothing circuit elememt, closure of the current interrupting means enabling first asymmetrical current pulses to be passed through the first transformer winding thereby blocking the gating circuit, the said pulses inducing at the same time second asymmetrical current pulses in the second transformer winding, opening of the current interrupting means inducing third asymmetrical current pulses in the first transformer winding which are oppositely directed from the first asymmetrical current pulses to open the gating circuit, means including an electric energy storage member connecting the direct current input terminals, the current interrupting means including a current interrupting member in each of the connection leads to the first transformer winding, the gating circuit comprising two branches which are cross-wise connected between connection leads from the first transformer winding to the current interrupting members and from the current interrupting members to the two direct current input terminals, respectively.

2. A direct current converter as claimed in claim 1 wherein the energy storage member comprises a capacitor.

3. A direct current converter comprising a first series connection including a first direct current input terminal, current interrupter active in one direction, a first transformer winding, and a second direct current input terminal, a gating circuit connected to the first transformer winding, a second series connection including a first direct current output terminal, a rectifying element, a second transformer winding electromagnetically coupled to the first transformer winding, and a second direct current output terminal, means connecting the said second series connection to a smoothing circuit element, means for applying a closure command signal to the current interrupter to allow the passage of first asymmetrical current pulses through the first transformer winding thereby blocking the gating circuit, the first and second transformer windings being relatively wound and the rectifying element being polarized so that said first current pulses induce at the same time second asymmetrical current pulses in the second transformer winding, opening of the current interrupter inducing third asymmetrical current pulses in the first transformer winding which are oppositely directed from the first asymmetrical current pulses to open the gating circuit, means directly connecting a signal element to terminals of the second transformer winding for generating, under the instantaneous control of a voltage difference between said terminals, a blocking signal for blocking the passage of said command signal to said current interrupter.

4. A direct current converter as claimed in claim 1 further comprising a series resistor connected in a supply lead to one of the direct current input terminals, a switching element bridging said series resistor, a third transformer winding electromagnetically coupled to the first transformer winding, and a rectifying-smoothing circuit connected to said third winding for applying a control signal to the switching element to render same conductive.

5. A direct current converter comprising, a pair of input terminals for connection to a source of DC current, unidirectional controlled switching means, a transformer having first and second magnetically coupled windings, a gating circuit coupled to the first winding, means connecting said controlled switching means and said first winding in series across the input terminals, a pair of DC output terminals, a rectifying element, means connecting the second winding and the rectifying element in series across the DC output terminals, a filter element coupled to said DC output terminals, means for operating said switching means between its conductive and cut-off regions whereby first and second opposed asymmetric currents flow simultaneously through said first and second windings in the conductive condition of the switching means a third oppositely polarized asymmetric current flows in the first winding in the cut-off condition of the switching means, said first and third asymmetric currents being polarized to open and close the gating circuit, respectively, and means responsive to the instantaneous value of the voltage induced in the second winding for supplying a rapidly varying control signal to the operating means to control the operating time thereof.

6. A direct current converter as claimed in claim 5 further comprising a capacitor connected across the DC input terminals and wherein the switching means includes first and second controlled electronic switches in series with the first winding, and said gating circuit comprises first and second unidirectional current elements connected cross-wire between the terminals of the first winding and the terminals of said first and second switches that are electrically closest to the DC input terminals.

7. A direct current converter as claimed in claim 5 wherein said gating circuit includes a rectifying element and a voltage threshold element serially connected to the first winding and wherein the control signal supplying means is coupled to the second winding at the input side of the filter element.

8. A direct current converter as claimed in claim 5 wherein said control signal supplying means includes a transistor with its control electrode coupled to the second winding at the input side of the filter element and an output electrode coupled to an inhibit circuit connected between the operating means and a control electrode of the controlled switching means.

9. A direct current converter as claimed in claim 5 further comprising a capacitor connected across the DC input terminals and wherein said gating circuit includes diode means coupling the first winding to the capacitor and poled so that the capacitor is recharged by the third asymmetric current.

* * * * *